United States Patent Office 3,277,172
Patented Oct. 4, 1966

3,277,172
TETRAPHENYLBORON DERIVATIVES OF
TETRACYCLINE ANTIBIOTICS
Joseph F. Alicino, South Plainfield, N.J., assignor, by mesne assignments, to E. R. Squibb & Sons, Inc., New York, N.Y., a corporation of Delaware
No Drawing. Filed July 10, 1964, Ser. No. 381,894
7 Claims. (Cl. 260—559)

This invention relates to tetraphenylboron derivatives of the tetracycline antibiotics. The tetracycline antibiotics include tetracycline, chlortetracycline, oxytetracycline and chlormethylenecycline (which are preferred) as well as 6-demethyltetracycline, 7-chloro-6-demethyltetracycline, 6-demethyloxytetracycline and other members of this known family of antibiotics (see for example U.S. Patents 3,122,578 and 3,080,288 which include also 7-chloro-6-deoxytetracycline,
7-chloro-5-hydroxy-6-deoxytetracycline,
5-hydroxy-6-deoxytetracycline,
6-deoxytetracycline,
7-bromo-6-demethyl-6-deoxytetracycline,
7-chloro-6-demethyl-6-deoxytetracycline,
7-iodo-6-demethyl-6-deoxytetracycline,
7-nitro-6-demethyl-6-deoxytetracycline,
9-nitro-6-demethyl-6-deoxytetracycline,
7-bromo-6-deoxytetracycline,
7-iodo-6-deoxytetracycline,
9-nitro-6-deoxytetracycline,
7-nitro-6-deoxytetracycline,
7-amino-6-demethyl-6-deoxytetracycline,
9-amino-6-demethyl-6-deoxytetracycline,
9-amino-6-deoxytetracycline,
9-amino-7-bromo-6-deoxytetracycline,
9-amino-7-nitro-6-deoxytetracycline,
7-iodo-5-hydroxy-6-deoxytetracycline,
7-bromo-5-hydroxy-6-deoxytetracycline,
5-hydroxy-6-deoxytetracycline,
9-amino-7-bromo-6-demethyl-6-deoxytetracycline,
7-bromo-9-nitro-6-demethyl-6-deoxytetracycline,
9-amino-7-chloro-6-demethyl-6-deoxytetracycline,
7-chloro-9-nitro-6-demethyl-6-deoxytetracycline, etc.).

The new compounds of this invention are produced by reacting the tetracycline in the form of the free base or an acid addition salt such as hydrohalide, principally the hydrochloride, with a salt of tetraphenylboron, e.g., an alkali metal salt especially sodium tetraphenylboron, in an acid aqueous medium. The product precipitates in quantitative yield and may be isolated by filtration. While the structure of the product has not definitely been fixed, the indications are that the tetraphenylboron and tetracycline antibiotic are linked at the basic nitrogen in the 4-position.

The products of this invention have the same antibacterial activity as the tetracyclines themselves and may be formulated and used as such. More particularly, they provide a convenient means for separating, isolating and purifying the tetracyclines in which case the tetracycline compound itself may be afterward regenerated by making the compound alkaline e.g., with an alkali metal hydroxide such as sodium hydroxide, or alkali metal alcoholate such as sodium methoxide or sodium ethoxide. They are especially useful as analytical tools for the identification and assay of the tetracyclines since they precipitate the tetracyclines quantitatively in aqueous acid medium.

The following examples are illustrative of the invention. All temperatures are expressed in degrees centigrade.

*Example 1*

1.2 grams of sodium tetraphenylboron are dissolved in water. This solution is added to a solution of 1 gm. of tetracycline hydrochloride dissolved in about 20 ml. of 0.1 N HCl while stirring. The pale yellow precipitate of tetracycline tetraphenylboron is allowed to stand for about 2 hours in the refrigerator and then filtered. The precipitate is washed with several portions of distilled water, sucked dry in a vacuum pump, then dried at 60° in vacuum oven. The yield of tetraphenylboron tetracycline is quantitative, darkens at 240°, decomposes at 265–270°.

*Analysis.*—Calcd.: C, 72.09; H, 5.93; N, 3.81; B, 1.52. Found: C, 72.38; H, 5.78; N, 3.67; B, 1.42.

*Example 2*

The substitution of chlortetracycline for the tetracycline in the procedure of Example 1 yields tetraphenylboron chlortetracycline, decomposes at 270–275°.

*Example 3*

By substituting oxytetracycline for the tetracycline in the procedure of Example 1, tetraphenylboron oxytetracycline is obtained, decomposes above 250°.

*Example 4*

By substituting chlormethylenecycline for the tetracycline in the procedure of Example 1, tetraphenylboron chlormethylenecycline is obtained, decomposes at 280–287°.

Similarly, by substituting other tetracycline antibiotics for the tetracycline in the procedure of Example 1, the respective tetraphenylboron derivatives are obtained.

What is claimed is:
1. The reaction product of a tetracycline of the group consisting of
tetracycline,
chlortetracycline,
oxytetracycline,
chlormethylenecycline,
6-demethyltetracycline,
7-chloro-6-demethyltetracycline,
6-demethyloxytetracycline,
7-chloro-6-deoxytetracycline,
7-chloro-5-hydroxy-6-deoxytetracycline,
5-hydroxy-6-deoxytetracycline,
6-deoxytetracycline,
7-bromo-6-demethyl-6-deoxytetracycline,
7-chloro-6-demethyl-6-deoxytetracycline,
7-iodo-6-demethyl-6-deoxytetracycline,
7-nitro-6-demethyl-6-deoxytetracycline,
9-nitro-6-demethyl-6-deoxytetracycline,
7-bromo-6-deoxytetracycline,
7-iodo-6-deoxytetracycline,
9-nitro-6-deoxytetracycline,
7-nitro-6-deoxytetracycline,
7-amino-6-demethyl-6-deoxytetracycline,
9-amino-6-demethyl-6-deoxytetracycline,
9-amino-6-deoxytetracycline,
9-amino-7-bromo-6-deoxytetracycline,
9-amino-7-nitro-6-deoxytetracycline,
7-iodo-5-hydroxy-6-deoxytetracycline,
7-bromo-5-hydroxy-6-deoxytetracycline,
9-amino-7-bromo-6-demethyl-6-deoxytetracycline,
7-bromo-9-nitro-6-demethyl-6-deoxytetracycline,
9-amino-7-chloro-6-demethyl-6-deoxytetracycline,
and 7-chloro-9-nitro-6-demethyl-6-deoxytetracycline and a salt of tetraphenylboron.
2. The reaction product of tetracycline and a salt of tetraphenylboron.

3. The reaction product of oxytetracycline and a salt of tetraphenylboron.

4. The reaction product of chlortetracycline and a salt of tetraphenylboron.

5. The reaction product of chlormethylenecycline and a salt of tetraphenylboron.

6. The reaction product of 6-demethyltetracycline and a salt of tetraphenylboron.

7. The process for producing the reaction product of a tetracycline antibiotic with a salt of tetraphenylboron which comprises reacting a tetracycline antibiotic with a salt of tetraphenylboron in aqueous acid medium and precipitating the product.

No references cited.

ALEX MAZEL, *Primary Examiner.*

HENRY R. JILES, *Examiner.*

JAMES W. ADAMS, JR., *Assistant Examiner.*